United States Patent
Bichot et al.

(10) Patent No.: US 11,812,114 B2
(45) Date of Patent: Nov. 7, 2023

(54) METHOD AND SERVER FOR AUDIO AND/OR VIDEO CONTENT DELIVERY

(71) Applicant: BROADPEAK, Cesson Sevigne (FR)

(72) Inventors: Guillaume Bichot, Cesson Sevigne (FR); Pierre-Jean Guery, Cesson Sevigne (FR); Vincent Richard, Cesson Sevigne (FR); Nicolas Le Scouarnec, Cesson Sevigne (FR)

(73) Assignee: BROADPEAK, Cesson Sevigne (FR)

( * ) Notice: Subject to any disclaimer, the term of this patent is extended or adjusted under 35 U.S.C. 154(b) by 0 days.

(21) Appl. No.: 17/915,330

(22) PCT Filed: Apr. 26, 2021

(86) PCT No.: PCT/EP2021/060862
§ 371 (c)(1),
(2) Date: Sep. 28, 2022

(87) PCT Pub. No.: WO2021/219563
PCT Pub. Date: Nov. 4, 2021

(65) Prior Publication Data
US 2023/0143627 A1     May 11, 2023

(30) Foreign Application Priority Data

Apr. 27, 2020 (EP) .................................. 20315225

(51) Int. Cl.
*H04L 43/0864* (2022.01)
*H04N 21/6373* (2011.01)
*H04N 21/2183* (2011.01)

(52) U.S. Cl.
CPC ..... *H04N 21/6373* (2013.01); *H04L 43/0864* (2013.01); *H04N 21/2183* (2013.01)

(58) Field of Classification Search
None
See application file for complete search history.

(56) References Cited

U.S. PATENT DOCUMENTS

| 10,034,048 B2 * | 7/2018 | Bichot | .................... H04L 65/70 |
| 2013/0013803 A1 * | 1/2013 | Bichot | ................ H04N 19/164 |
| | | | 709/231 |

(Continued)

FOREIGN PATENT DOCUMENTS

GB     2577610 A     4/2020

OTHER PUBLICATIONS

Jul. 5, 2021 International Search Report issued in International Patent Application No. PCT/EP2021/060862.

(Continued)

*Primary Examiner* — James A Edwards
(74) *Attorney, Agent, or Firm* — Williams Mullen; R. Brian Drozd (57) ABSTRACT

For delivering an audio and/or video content using adaptive streaming from a cache server to a client device, the audio and/or video content being segmented into data segments available in various representations with respective audio and/or video qualities, the representations being time-aligned per segment, the segments being further divided into chunks, a method includes: obtaining a round-trip time value applicable between the cache server and the client device; computing a minimum bulk transfer size from the maximum average bitrate of the various representations of the audio and/or video content and from the obtained round-trip time value; computing a minimum bulk duration, with respect to the audio and/or video content, for the representation to be delivered to the client device; and delivering the audio and/or video content by burst transfers in the form of bulks of aggregated successive chunks for each segment in accordance with the computed minimum bulk duration.

11 Claims, 4 Drawing Sheets

(56) References Cited

U.S. PATENT DOCUMENTS

| | | | | |
|---|---|---|---|---|
| 2015/0296269 | A1* | 10/2015 | Tokumo | H04N 21/2187 |
| | | | | 725/100 |
| 2016/0205164 | A1* | 7/2016 | Schmidt | H04L 65/70 |
| | | | | 709/219 |
| 2018/0041561 | A1 | 2/2018 | Davies et al. | |
| 2019/0306551 | A1* | 10/2019 | Arye | H04N 21/44209 |

OTHER PUBLICATIONS

Jul. 5, 2021 Written Opinion issued in International Patent Application No. PCT/EP2021/060862.

Robert Kuschnig et al. "Evaluation of HTTP-based Request-Response Streams for Internet Video Streaming". MMSYS '11 Proceedings of the Second Annual ACM Conference on Multimedia Systems, Feb. 23, 2011, pp. 245-256.

Nassima Bouzakaria et al. "Overhead and Performance of Low Latency Live Streaming Using MPEG-Dash". IISA 2014, The 5th International Conference on Information, Intelligence, Systems and Applications, IEEE, Jul. 7, 2014, pp. 92-97.

Mincheng Zhao et al. "QOE-Driven Cross-Layer Optimization for Wireless Dynamic Adaptive Streaming of Scalable Videos Over HTTP". IEEE Transactions on Circuits and Systems for Video Technology, Institute of Electrical and Electronics Engineers, US, vol. 25, No. 3, Mar. 1, 2015, pp. 451-456.

Viswanathan Swaminathan et al., "Low Latency Live Video Streaming Using HTTP Chunked Encoding", Advanced Technology Labs, Adobe Systems Incorporated. Copyright IEEE, 2011.

\* cited by examiner

METHOD AND SERVER FOR AUDIO AND/OR VIDEO CONTENT DELIVERY

TECHNICAL FIELD

The present invention generally relates to delivering an audio and/or video content from a server equipment to a client device using adaptive bit rate, also referred to as adaptive streaming.

RELATED ART

In HTTP ("Hypertext Transfer Protocol") adaptive streaming, a client device interacts with a server equipment for requesting parts, referred to as segments, of an audio and/or video stream (live content) or file (Video On-Demand content) to be played out. The audio and/or video stream or file is encoded in several qualities, referred to as representations. Each of the representations is composed of a succession of segments of equal duration with respect to the audio and/or video content. The representations are therefore time-aligned per segment and start with the same audio and/or video reference frame, thus enabling the client device, and more particularly an audio and/or video player included therein, switching from one representation to another representation on segment boundaries.

In adaptive streaming technology such as HLS (standing for "HTTP Live Streaming", which is a live streaming communications protocol based on HTTP and developed by Apple Inc.) or DASH (standing for "Dynamic Adaptive Streaming over HTTP", which is a multimedia streaming technology developed by the Moving Picture Experts Group (MPEG)), switching from one representation to another representation is driven by the client device, meaning that the client device requests the server equipment to switch to said another representation. Typically, the client device selects appropriate representation based on evaluation of available bandwidth from the server equipment to the client device and potentially other criteria like buffer occupancy, screen resolution, decoder capabilities, ...

Emerging low latency technologies for live streaming such as CTE (Chunked Transfer Encoding) with MPEG CMAF (Common Media Application Format) or LL HLS (Low Latency HLS) enable early playback of audio and/or video contents by particular chunks management that don't need availability of a full segment before starting playback.

Thus, in a Content Delivery Network (CDN) deployment for adaptive streaming, an originating server (also referred to as origin server) acting as a packager equipment provides the representations in the form of segments split into chunks ready to be sent whenever the related segment is requested by a cache server. The chunks correspond to a predefined duration of the audio and/or video content and are thus smaller encoded units than the segments. The cache server serves the client device upon receiving segment requests therefrom, by delivering chunks in burst transfers.

Although these low latency technologies speed up data delivery, they create disturbances when estimating available bandwidth. Inappropriate audio and/video content representation (quality) may consequently be selected and thus QoE may be lowered.

Throughput from the cache server to the client device may be constrained by either link capacity from the cache server to the client device or by Round Trip Time (RTT) between the cache server and the client device.

Let's consider an illustrative example as follows. A video content is made available in three representations, with corresponding bitrates of 3 Mbps, 2 Mbps and 1 Mbps. The video content is divided into segments having a duration of 2 seconds with respect to the video content, and further divided into chunks of duration of 200 milliseconds with respect to the video content (10 chunks per segment). Let's consider an RTT of 100 milliseconds and a maximum bottleneck bandwidth of 8 Mbps. The client device (player) having requested a 1 Mbps video segment, which is delivered chunk after chunk, this leads to a bandwidth estimation of 2 Mbps, although effective capacity equals 8 Mbps.

It means that the client device or the cache server trying to assess the maximum available bandwidth though analyzing the quantity of bits transmitted during a burst period corresponding to transmission of a chunk wrongly estimates 2 Mbps of available bandwidth, far below real available bandwidth, precluding usage of higher quality representations (having higher bitrate). The situation is certainly even worse than what is shown in the foregoing example because splitting a segment in chunks of equal duration with respect to the audio and/video content does not lead to chunks with equal size (i.e., quantity of bits). Indeed, considering a video content, a chunk including I picture data (according to conventional IPB compression scheme) is certainly of a greater size than average size of 200 kbits used in the foregoing example to estimate the available bandwidth whereas other chunks including other data of the same video frame are of a lower size. Depending on which chunks are considered in the congestion time window for estimating available bandwidth, it may lead to an even more reduced available bandwidth estimation, which may also be amplified when there is network buffering between the cache server and the client device.

It can further be noted that when the RTT is different, the resulting available bandwidth estimation is different, for example, with a RTT equal to 10 milliseconds, it would have resulted in a theorical bandwidth estimation of 20 Mbps, which is indeed bounded by the maximum bottleneck bandwidth of 8 Mbps (link capacity).

It is thus desirable to overcome the foregoing drawbacks of the prior art, and more particularly to improve QoE when delivering an audio and/or video content from a server equipment to a client device using adaptive bit rate. It is also particularly desirable to provide a solution that is simple to implement and that is cost-effective.

SUMMARY OF THE INVENTION

To that end, it is disclosed herein a method for delivering an audio and/or video content using adaptive streaming from a cache server to a client device, the audio and/or video content being segmented into data segments available in various representations with respective audio and/or video qualities, the representations being time-aligned per segment, the segments being further divided into chunks, wherein the method comprises: obtaining a round-trip time value applicable between the cache server and the client device; computing a minimum bulk transfer size mTBS from the maximum average bitrate of the various representations of the audio and/or video content and from the obtained round-trip time value; computing a minimum bulk duration mTBDi, with respect to the audio and/or video content, for the representation i of the audio and/or video content which has to be delivered to the client device; and delivering the audio and/or video content by burst transfers in the form of L bulks of at least one chunk or aggregated successive chunks for each segment, the L bulks containing jointly audio and/or video content data corresponding to said segment, and wherein, for each segment, at least L−1 bulk or bulks are respectively formed by M chunk or chunks such that $$\sum_{j=1}^{M} CH_j > mTBDi$$

and $$\sum_{j=1}^{M-1} CH_j \leq mTBDi$$

wherein $CH_j$ (j=1, ... ,M) represents the time duration of the chunk j with respect to the audio and/or video content. Thus, by performing burst transfers with bulks duration defined by taking into account the round trip time value applicable between the cache server and the client device, effective bandwidth estimation can be performed. Consequently, appropriate selection of the representation of the audio and/or video content can be made, which improves QoE.

According to a particular embodiment, the round-trip time value is stored by the cache server as a default configuration parameter and corresponds to the maximum possible round trip time the cache server has to deal with when delivering audio and/or video content data to any client device.

According to a particular embodiment, the round-trip time value is average round trip time value computed by the cache server over time by analyzing sessions for delivering audio and/or video contents to client devices.

According to a particular embodiment, such round-trip time value is used as initial configuration and definition of the minimum bulk transfer size mTBS and the minimum bulk duration mTBDi, and then dynamically updated, as well as the minimum bulk transfer size mTBS and the minimum bulk duration mTBDi, according to measurements of round trip time between the cache server and the client device.

According to a particular embodiment, the same round trip time value is used over a whole session of delivering audio and/or video content.

According to a particular embodiment, for obtaining the round trip time value, the cache server, when receiving from the client device a request for obtaining a playlist or manifest file related to the audio and/or video content, the cache server redirects the client device so as to force the client device to retransmit the request in question, and computes the round trip time value as the time difference from the instant at which the cache server redirected the client device to the instant at which the cache server receives again the request in question from the client device.

According to a particular embodiment, the cache server indicates in the playlist or manifest file that a duration of partial segments equals the duration of the bulk of chunks as defined as function of the round trip time value.

According to a particular embodiment, a manifest file related to the audio and/or video content indicates that segment request can be made as soon as a chunk is theoretically available, and wherein the cache server blocks processing of segment request received from the client device until enough chunks of the requested segment are available in cache to build the bulk to be transmitted in response.

It is further disclosed herein a computer program product comprising program code instructions that can be loaded in a programmable device for implementing the foregoing method in any one of its embodiments, when the program code instructions are run by the programmable device. It is further disclosed herein an information storage medium storing such a computer program.

It is further disclosed herein a cache server configured for delivering an audio and/or video content using adaptive streaming to a client device, the audio and/or video content being segmented into data segments available in various representations with respective audio and/or video qualities, the representations being time-aligned per segment, the segments being further divided into chunks, wherein the cache server comprises electronic circuitry configured for: obtaining a round-trip time value applicable between the cache server and the client device; computing a minimum bulk transfer size mTBS from the maximum average bitrate of the various representations of the audio and/or video content and from the obtained round-trip time value; computing a minimum bulk duration mTBDi, with respect to the audio and/or video content, for the representation i of the audio and/or video content which has to be delivered to the client device; and delivering the audio and/or video content by burst transfers in the form of L bulks of at least one chunk or aggregated successive chunks for each segment, the L bulks containing jointly audio and/or video content data corresponding to said segment, and wherein, for each segment, at least L−1 bulk or bulks are respectively formed by M chunk or chunks such that $$\sum_{j=1}^{M} CH_j > mTBDi$$

and $$\sum_{j=1}^{M-1} CH_j \leq mTBDi$$

wherein $CH_j$ (j=1, ... ,M) represents the time duration of the chunk j with respect to the audio and/or video content.

It is further disclosed herein a Content Delivery Network including the foregoing cache server.

BRIEF DESCRIPTION OF THE DRAWINGS

The characteristics of the invention will emerge more clearly from a reading of the following description of at least one embodiment, said description being produced with reference to the accompanying drawings, among which.

DETAILED DESCRIPTION OF AT LEAST ONE EMBODIMENT

Figure 1:
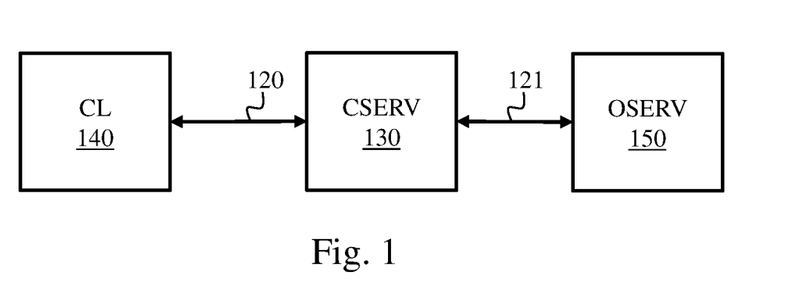
FIG. 1 schematically represents an audio and/or video content delivery system in which the present invention may be implemented.

FIG. 1 schematically represents an audio and/or video content delivery system 100 comprising a cache server CSERV 130 and at least one client device CL 140. The audio and/or video content delivery system 100 further comprises an originating server OSERV 150.

The cache server CSERV 130 is the equipment in charge of delivering segments of at least one audio and/or video content to the at least one client device CL 140 via a communication link 120. The cache server CSERV 130 may be a single server or a cluster of servers. The cache server CSERV 130 may be part of a Content Delivery Network including at least one such server equipment.

The communication link 120 may be a physical link, such as a cable or a series of cables, or a wireless link. The communication link 120 may be a logical link, such as a communication path over the Internet.

One client device CL 140 is represented in FIG. 1, but the audio and/or video content delivery system typically comprises numerous client devices.

The originating server OSERV 150 is in charge of packaging the at least one audio and/or video content in the form of segments divided into chunks. The originating server OSERV 150 provides the audio and/or video content in plural representations (qualities) having respective bitrates. The originating server equipment OSERV 150 may be a single server or a cluster of servers. The cache server CSERV 130 obtains the at least one audio and/or video content from the originating server equipment OSERV 150 via a communication link 121.

The communication link 121 may be a physical link, such as a cable or a series of cables, or a wireless link. The communication link 121 may be a logical link, such as a communication path over the Internet.

Figure 2:
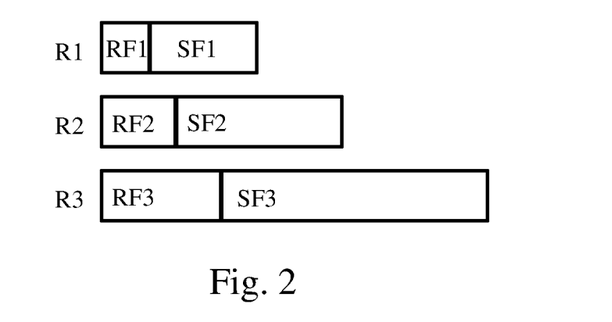
FIG. 2 schematically represents time-aligned segments of various representations.

As disclosed hereafter with respect to FIG. 2, the higher the quality of a representation, the higher the corresponding bitrate. Segments are time-aligned between all representations of any one said audio and/or video content, thus enabling switching from one representation to another depending on which representation bitrate better suits to available bandwidth estimation so as to achieve best QoE as possible.

Chunks are of equal duration with respect to the audio and/or video content. This chunk duration defines a minimum bulk transfer time unit between the originating server OSERV 150 and the cache server CSERV 130, and more importantly between the cache server CSERV 130 and the at least one client devices CL 140. The originating server OSERV 150 is configured to generate chunks with a chunk duration function of the minimum RTT the audio and/or video content delivery system 100 is expected to deal with. For instance it could be 50 milliseconds.

When the cache server CSERV 130 belongs to a CDN with several such cache servers, this chunk duration (which is a minimum bulk transfer unit, as apparent in the detailed explanation hereafter) may be the same for plural or all said cache servers, or different from one cache server to another.

The audio and/or video contents are typically accompanied with respective manifest files. Each manifest file relates to the audio and/or video content and describes how the segments of the audio and/or video content are made available, more particularly which representations (qualities) of the audio and/or video content in question are available. It should be noted that, depending on the Adaptive Bit Rate technology in use, the manifest file may be referred to as playlist. Thus, the originating server OSERV 150 adapts each manifest file attached to the cache server CSERV 130 according to this chunk duration (or minimum bulk transfer unit) that applies to the cache server CSERV 130. For example, in low latency MPEG DASH, there is indicated a time offset in a field called availabilityTimeOffset that is used by the client device CL 140 for computing the right moment to submit a segment request. The client device CL 140 is expected to subtract the value of availabilityTimeOffset from the theoretical instant corresponding to the segment request submission by the cache server CSERV 130. This value is valid for the entire session and is computed function of the chunk duration. Whatever the original source of the manifest file, one must be sure that the availabilityTimeOffset value has been computed function of the chunk duration (minimum bulk transfer time unit) associated with the cache server CSERV 130.

The cache server CSERV 130 serves the at least one client device CL 140 upon receiving segment requests therefrom, by delivering bulks of chunks in burst transfers. As disclosed hereafter, the cache server CSERV 130 forms the bulks of chunks by aggregating the chunks depending on RTT value applicable between the cache server CSERV 130 and the concerned at least one client device CL 140.

Each client device CL 140 comprises a player and a decoder. The decoder is configured (initialized or reinitialized) by the player according to encoding format and quality (i.e., representation) effectively in use and is in charge of decoding in accordance audio and/or video data received by the player. The player is in charge of performing exchanges with the cache server equipment CSERV 130 so as to receive the encoded audio and/or video data from the cache server CSERV 130. The player requests segments of at least one audio and/or video content and the cache server CSERV 130 transmits in return the requested segments in the form of bulks of chunks in burst transfers.

Considering a session for delivering an audio and/or video content from the cache server CSERV 130 to one said client device CL 140, available bandwidth evaluation is performed by the cache server CSERV 130 and/or by the client device CL 140. Available bandwidth evaluation enables selecting one representation of the audio and/or video content depending on which representation bitrate better suits to the available bandwidth estimation so as to achieve best QoE as possible. For example, available bandwidth estimation is performed by using BBR (Bottleneck Bandwidth and Round-trip propagation time) information. BBR approach is a recent congestion control algorithm that is particularly well suited to wireless communication and that can be used in association with the TCP protocol or other transport protocol (e.g., QUIC over UDP (User Datagram Protocol)). Alternative embodiments where available bandwidth estimation is made using other congestion control algorithms such as in TCP CUBIC, VEGAS, RENO or in other transport protocols such as QUIC, SCTP (Stream Control Transmission Protocol) . . . are possible. Alternatively, the available bandwidth estimation is directly performed by analyzing transport protocol traffic shape (data packets and acknowledge packets) of at least one transport connection (e.g., TCP connection) used to deliver the chunks to the client device CL 140 in question.

As shown in FIG. 2, each audio and/or video content is made available in various representations R1, R2, R3, with respective audio and/or video qualities. One segment of any and all representations (e.g., R1) of the audio and/or video content contains the same content part as the same segment of any and all other representations (e.g., resp. R2, R3) of the audio and/or video content. In other words, the segments of the various representations R1, R2, R3 are time-aligned. Each segment starts with a reference frame RF. In FIG. 2, considering the same segment of the audio and/or video content, the reference frame RF is labelled RF1 for the representation R1, the reference frame RF is labelled RF2 for the representation R2 and the reference frame RF is labelled RF3 for the representation R3. Moreover, the reference frame RF is followed by at least one subsequent frame SF in the segment. In FIG. 2, the at least one subsequent frame SF is labelled SF1 for the representation R1, the at least one subsequent frame SF is labelled SF2 for the representation R2 and the at least one subsequent frame SF is labelled SF3 for the representation R3.

Since the representations R1, R2, R3 correspond to different qualities, the size of one segment of any and all representations (e.g., R1) typically differs from the size of the same segment of any and all other representations (e.g., resp. R2, R3). Indeed, segment size increases with quality, as shown in FIG. 2 where the same segment of the representations R1, R2, R3 is schematically represented, and where it is considered that the representation R3 corresponds to a better quality than the representation R2 and the representation R2 corresponds to a better quality than the representation R1. Consequently the size of the reference frame RF3 in the representation R3 is bigger than the size of the reference frame RF2 in the representation R2, and the size of the reference frame RF2 in the representation R2 is bigger than the size of the reference frame RF1 in the representation R1. In addition, the size of the subsequent frames SF3 in the representation R3 is bigger than the size of the subsequent frames SF2 in the representation R2, and the size of the subsequent frames SF2 in the representation R2 is bigger than the size of the subsequent frames SF1 in the representation R1. As a consequence, bandwidth requirements also increase with audio and/or video quality.

Figure 3:
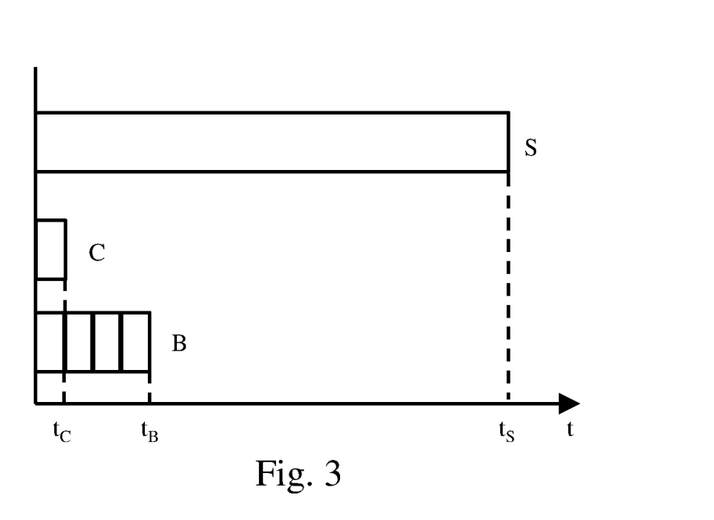
FIG. 3 schematically represents a segment, a chunk and a bulk with respect to time.

As shown in FIG. 3, considering a segment S of an audio and/or video content, the segment S in question covers a time duration $t_S$ of the audio and/or video content. The segment S is divided into chunks. A chunk C of the segment S has a lower duration $t_c$ of the audio and/or video content, which defines a minimum bulk transfer time unit. Thus, bulks B of chunks C are formed by the cache server CSERV 130 by aggregation of the chunks C in question, thus corresponding to a duration $t_B$ of the audio and/or video content (also lower than the duration $t_S$ of the segment S with respect to the audio and/or video content). The number of chunks C in the aggregation forming the bulk B to be transmitted in a burst transfer from the cache server CSERV 130 to the concerned client device CL 140 is defined according to RTT value to be considered between the cache server CSERV 130 and the client device CL 140 in question.

Figure 4:
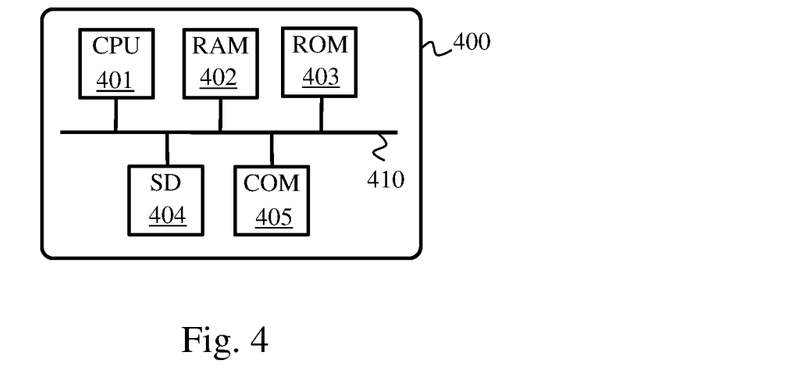
FIG. 4 schematically represents an example of hardware architecture of a device usable in the scope of the audio and/or video content delivery system.

FIG. 4 schematically represents an example of hardware architecture 400 usable in the scope of the audio and/or video content delivery system 100. The hardware architecture may be part of the cache server equipment CSERV 130. The hardware architecture may be part of the originating server equipment OSERV 150. The hardware architecture may be part of the client device CL 140.

The hardware architecture 400 comprises the following components interconnected by a communications bus 410: a processor, microprocessor, microcontroller or CPU (Central Processing Unit) 401; a RAM (Random-Access Memory) 402; a ROM (Read-Only Memory) 403, such as an EEPROM (Electrically Erasable Programmable ROM), for example a Flash memory; a HDD (Hard-Disk Drive) 404, or any other device adapted to read information stored on a storage medium, such an SD (Secure Digital) card reader; at least one communication interface COM 405.

CPU 401 is capable of executing instructions loaded into RAM 402 from ROM 403 or from an external memory, such as HDD 404 or an SD card. After the hardware architecture 400 has been powered on, CPU 401 is capable of reading instructions from RAM 402 and executing these instructions. The instructions form one computer program that causes CPU 401 to execute the steps performed disclosed herein with respect to the cache server equipment CSERV 130 or to the originating server equipment OSERV 150 or to the client device CL 140.

Thus, the steps and algorithms described herein may be implemented in software form by execution of a set of instructions or program by a programmable computing machine, such as a PC, a DSP (Digital Signal Processor) or a processor; or else implemented in hardware form by a machine or a dedicated component, chip or chipset, such as an FPGA (Field-Programmable Gate Array) or an ASIC (Application-Specific Integrated Circuit). More generally, the cache server equipment CSERV 130, the originating server equipment OSERV 150, and the client device CL 140400 comprise electronic circuitry configured to perform the steps and algorithms described herein with respect to the device or server in question.

Figure 5:
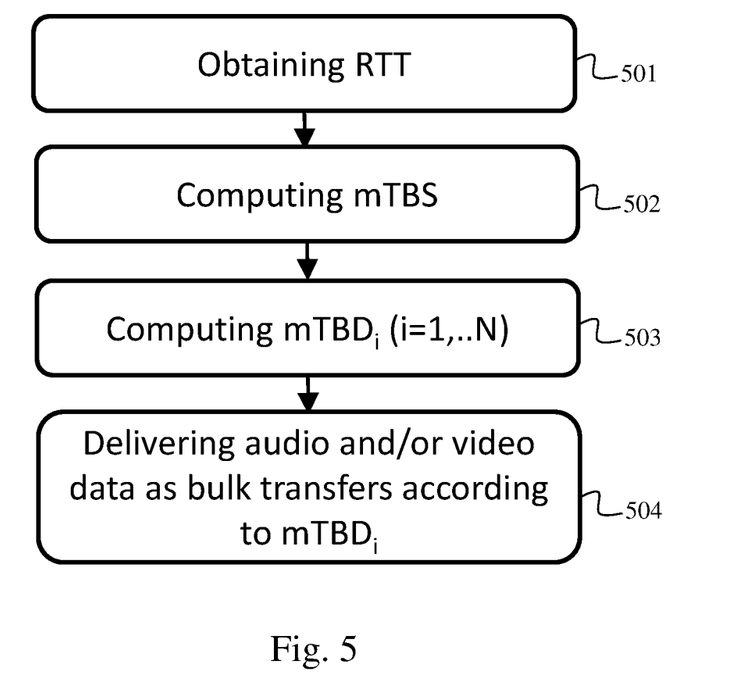
FIG. 5 schematically represents an algorithm for delivering audio and/or video content data in the form of bulks of chunks by burst transfers, in a particular embodiment.

FIG. 5 schematically represents an algorithm for delivering audio and/or video content data in the form of bulks of chunks by burst transfers, in a particular embodiment.

In a step 501, the cache server CSERV 130 obtains RTT information applicable between the cache server CSERV 130 and the client device CL 140 to which the audio and/or video content data have to be delivered. According to a first example, the RTT is measured by the cache server CSERV 130 during exchanges with the client device CL 140. Alternatively, during such exchanges, the RTT may be measured by the client device CL 140 and then provided by the client device CL 140 to the cache server CSERV 130. The RTT may be measured once for a whole session of delivering the audio and/or video content from the cache server CSERV 130 to the client device CL 140. Alternatively, the RTT is regularly measured. In another approach, the RTT is stored as a default configuration parameter and corresponds to the maximum possible RTT the cache server CSERV 130 has to deal with when delivering audio and/or video content data to any client device. Note that in case of CDN set up on top of a mobile network infrastructure, cache servers may be deployed at various locations in the mobile network infrastructure (within base stations, or within gateways . . . ). In this case, the default configuration parameter defining the maximum possible RTT may differ from one cache server to another depending on their respective locations in the mobile network infrastructure. Another embodiment is to use average RTT value. The average RTT value is computed by the cache server CSERV 130 over time by analyzing sessions for delivering audio and/or video contents to client devices. This approach enables reaching more rapidly an optimal bulk transfer size in case of dynamic update of the RTT value used for bulk duration definition, and is particularly efficient for CDN set up on top of a mobile network infrastructure. The embodiments of applicable RTT value recited above may be used over a whole session of delivering audio and/or video content, or be used as initial configuration and be then dynamically updated according to RTT measurements.

In a step 502, the cache server CSERV 130 computes a minimum bulk transfer size mTBS. Assuming N representations of the audio and/or video content (i=1, . . . ,N), each representation having an average bitrates Bi, the minimum bulk transfer size mTBS is computed as follows:

$$mTBS=C0*\max(B1 \ldots Bn)*RTT$$

wherein C0>1 is a constant adding a predefined margin that compensates potential errors in RTT estimation and further compensates that Bi is an average bitrate indication (which means the effective bitrate may vary around this average bitrate indication).

In a step 503, the cache server CSERV 130 computes a minimum bulk duration mTBDi, with respect to the audio and/or video content, for the representation i that has to be delivered to the client device CL 140, as follows:

$$mTBDi=mTBS/Bi$$

Referring to FIG. 3, the minimum bulk duration mTBDi (i=1, . . . ,N) corresponds to the minimum value of $t_B$, expressed preferably in seconds.

The cache server CSERV 130 may compute the minimum bulk duration mTBDi, for any representation i (i=1, . . . ,N) at each time a new RTT value is obtained (may be for the whole session). Alternatively, the cache server CSERV 130 only computes, at each time a new RTT value is obtained (may be for the whole session), the minimum bulk duration mTBDi, for the representation i (i=1, . . . ,N) that needs to be delivered to the client device CL 140.

In a step 504, the cache server CSERV 130 delivers the audio and/or video content data in the form of bulks of successive chunks, for instance received from the originating server OSERV 150 or from an intermediary upstream server). The cache server CSERV 130 transfers each bulk as one data burst.

The cache server CSERV 130 delivers the audio and/or video content by burst transfers in the form of L bulks of at least one chunk or aggregated successive chunks for each segment, the L bulks (L>1) containing jointly audio and/or video content data corresponding to said segment, and, for each segment, at least L−1 bulk or bulks are respectively formed by M chunk or chunks verifying the following conditions:

$$\sum_{j=1}^{M} CH_j > mTBDi$$

and $$\sum_{j=1}^{M-1} CH_j \leq mTBDi$$

wherein i indicates the representation to be delivered to the client CL 140, and which thus may change over time during the session, and wherein $CH_j$ (j=1, . . . ,M) represents the time duration of the chunk j with respect to the audio and/or video content.

In other words, the segment duration may not exactly correspond to L bulks of chunks all matching the conditions above. In this case, L−1 bulks match the conditions above and one bulk has a lower duration. Preferably, this bulk with a lower duration is the last one to be transmitted for the segment in question.

Note that by default all the chunks have the same duration but it is possible that the chunk duration changes for any reason.

In a preferred embodiment, the M successive chunks are selected such that the very first chunk (j=1) of the considered bulk is the next one in sequence that has not yet been transmitted to the client device CL 140.

Thus, when the client device CL 140 requests a segment of the audio and/or video content, the cache server CSERV 130 delivers, by burst transfers, aggregated chunks forming bulks as defined above. Since the way in which chunks are aggregated to form the bulks depends on the RTT value, bandwidth estimation is reliable and consequently appropriate representation of the audio and/or video content can be selected, either by the client device CL 140 or by the cache server CSERV 130, and be delivered, thus improving QoE.

When bulks duration is dynamically adapted during the session due to refined RTT value or monitored evolution of RTT value, it might be of interest to start with the highest quality representation of the audio and/or video content in order to rapidly obtain an accurate available bandwidth value. This is particularly the case when audio and/or video content representation selection is performed by the cache server CSERV 130.

Figure 6:
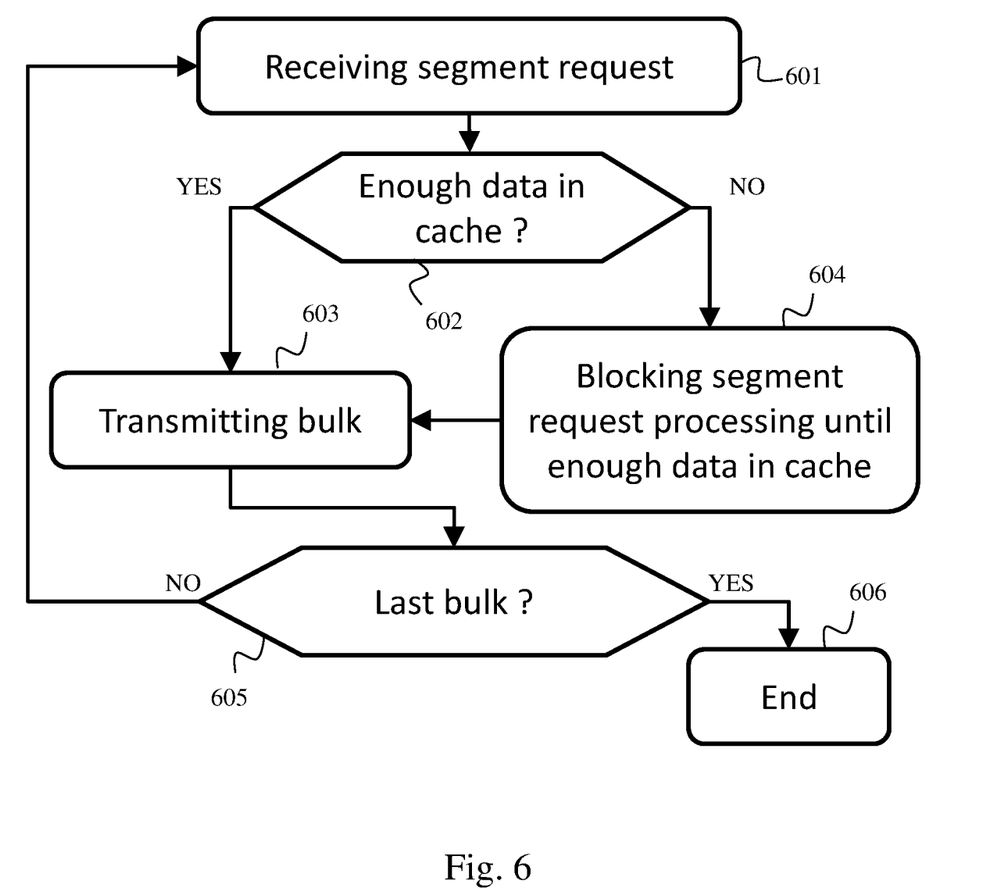
FIG. 6 schematically represents an algorithm for managing segment requests, in a particular embodiment.

FIG. 6 schematically represents an algorithm for managing segment requests, in a particular embodiment. Prior to the segment request, the client device CL 140 must request a manifest file. The cache server CSERV 130 obtains the manifest file from the originating server OSERV 150 and forwards it to the client device CL 140 on request.

Adequate time for the client device CL 140 to request a segment is usually determined (e.g., according to MPEG DASH) in low latency adaptive bit rate using manifest file information. It is indicated therein information representative of the appropriate timing for requesting a segment. For instance, in MPEG DASH, this information is indirectly indicated in a field called availabilityTimeOffset, which corresponds to a minimum time offset that the client device CL 140 has to subtract from the theoretical instant corresponding to the whole segment availability, as already mentioned. Typically, in non low latency, the client device CL 140 must wait for a duration that corresponds to an entire segment (e.g. 2 seconds) before submitting its segment request (in order to be sure that the segment has been entirely received by the cache server) and therefore, the availabilityTimeOffset value is either 0 or not present in the manifest file. In low latency, the client device can submit its segment request as soon as at least one chunk has been received by the cache server and therefore the availabilityTimeOffset value corresponds to the duration of a segment minus the duration of a chunk. For example, if the segment duration corresponds to 2 seconds of the audio and/or video content and the chunks duration corresponds to 40 milliseconds of the audio and/or video content, the availabilityTimeOffset value is fixed at 1.860 milliseconds. In general terms, the manifest file thus indicates that segment request can be made as soon as a chunk is theoretically available.

Because, according to RTT value, the bulk duration may be different across sessions or can be dynamically updated, and since the information representative of the appropriate timing for requesting a segment (e.g., availabilityTimeOffset according to MPEG DASH) is static in the manifest file, it may occur that the client device CL 140 requests a segment for which enough chunk data are not yet available to form an appropriate bulk and start sending the response.

In order to avoid returning an error code to the client device CL 140 in such a situation, it is proposed that the cache server CSERV 130 waits before sending the initial part of response (first bulk in sequence) to the client device CL 140 until enough chunks data are available for forming an appropriate first bulk to be delivered to the client device CL 140, as disclosed herein with respect to FIG. 6. Afterwards, the cache server CSERV 130 does the same for the rest of the segment response: wait until enough chunks data are available for forming an appropriate bulk to be delivered to the client device CL 140, as disclosed herein with respect to FIG. 6 and so on until the entire segment response is sent.

The cache server CSERV 130 receives, in a step 601, a segment request from the client device CL 140. The cache server CSERV 130 is supposed to respond to the request by transmitting bursts of chunks corresponding to the segment in question.

In a step 602, the cache server CSERV 130 checks whether enough said chunks are available in cache for building a bulk, as defined herein, to be transferred to the client device CL 140. If enough chunks are available in cache, the cache server CSERV 130, a step 603 is performed during which the cache server CSERV 130 initiates transmission of the bulk of chunks to the client device CL 140; otherwise, in a step 604, the cache server CSERV 130 blocks processing of the segment request. Building and transmission of the bulk are blocked until enough said chunks are available in cache for building said bulk, as defined herein, to be transferred to the client device CL 140, and then the step 604 is performed in accordance. In the step 605, the cache server CSERV 130 checks whether this was the last bulk of data to be transferred. If not it continues circling back to the step 602. Otherwise, in a step 606, this is the end of the segment transmission. Note that, as already mentioned, the last bulk of data may be of a smaller duration than the previous bulk or bulks, since the total number of chunks for the segment divided by M (the optimum number of chunks to form a bulk), as computed above, may not be equal to an integer number.

Figure 7:
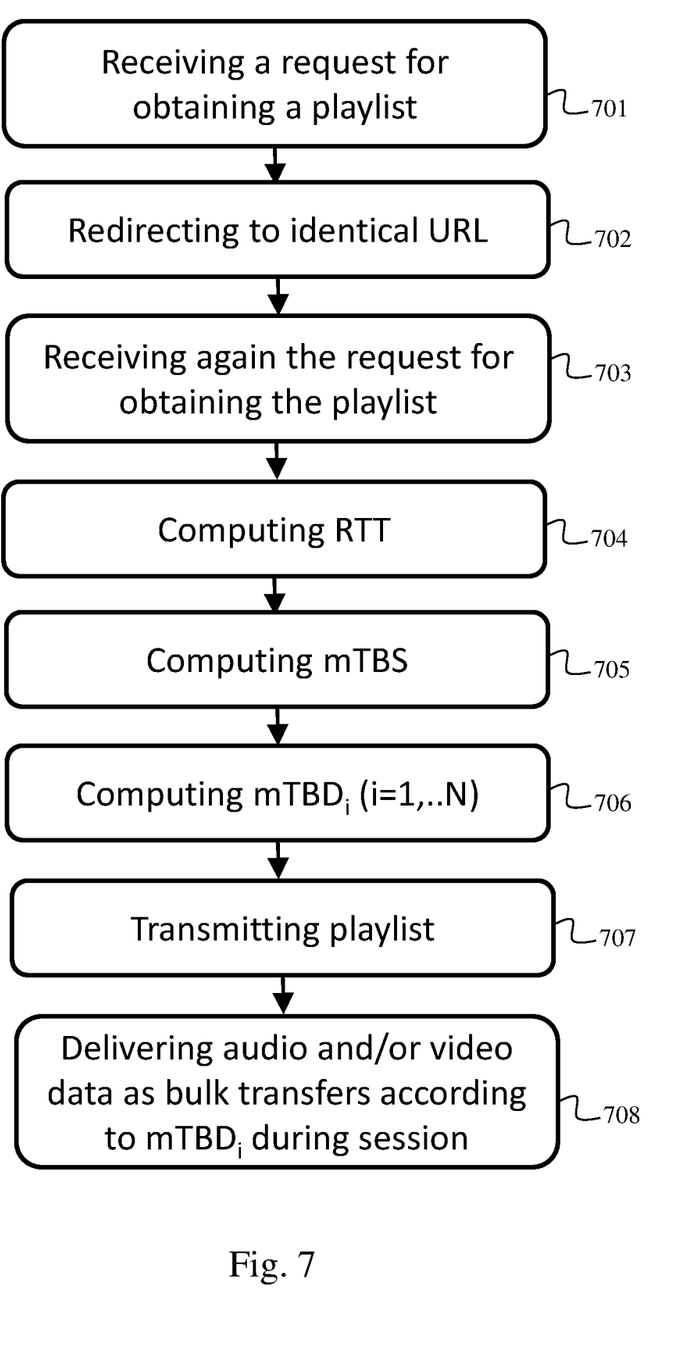
FIG. 7 schematically represents an algorithm for delivering audio and/or video content data in the form of bulks of chunks by burst transfers, in another particular embodiment.

FIG. 7 schematically represents an algorithm for delivering audio and/or video content data in the form of bulks of chunks by burst transfers, in another particular embodiment. HTTP is preferably used in the scope of FIG. 7.

With HLS in low latency approach, similarly to MPEG DASH, the manifest file, referred here to as playlist, gathers chunk duration information (chunks being called partial segments according to the HLS terminology) indicated in the playlist through a so-called PART-TARGET attribute. What differs from MPEG DASH is that the client device CL 140 requests explicitly partial segments, typically using a byte range information, whereas in MPEG DASH, the client device CL 140 requests a particular segment, which is delivered by bursts of chunks without boundaries being known in advance to the client device CL 140.

Since HLS in low latency approach defines that the client device CL 140 requests explicitly the partial segments (chunks), the bulk duration cannot be changed dynamically during the session. However, partial segment duration as indicated in the playlist can be adapted to be equal to bulk size on session basis. To do so, the RTT value has to be known by the cache server CSERV 130. A particular redirection feature is implemented to enable the cache server CSERV 130 to obtain the RTT value to be used, as detailed hereafter.

In a step 701, the cache server CSERV 130 receives a playlist (or manifest file) request from the client device CL 140. The requested playlist corresponds to an audio and/or video content to be then delivered to the client device CL 140. In a step 702, instead of responding thereto by transmitting the requested playlist (or manifest file), the cache server CSERV 130 redirects the client device CL 140 towards the same URL as the one that was used in the playlist request received in the step 701 from pointing out the audio and/or video content to which the requested playlist refers. To do so, the cache server CSERV 130 transmits a redirection message (HTTP Redirect) to the client device CL 140. By doing so, the cache server CSERV 130 forces the client device CL 140 to retransmit the playlist (or manifest file) request.

Therefore, in a step 703, the cache server CSERV 130 receives again the playlist (or manifest file) request from the client device CL 140.

Then, in a step 704, the cache server CSERV 130 computes the RTT value, which is estimated to be the time difference from the instant at which the cache server CSERV 130 redirected the client device CL 140 to the instant at which the cache server CSERV 130 received again the playlist (or manifest file) request from the client device CL 140.

In a step 705, the cache server CSERV 130 computes the minimum bulk transfer size mTBS as already explained with respect to FIG. 5.

In a step 706, the cache server CSERV 130 computes the minimum bulk duration mTBDi, with respect to the audio and/or video content, for each representation i (i=1, . . . ,N) that possibly has to be delivered to the client device CL 140, in a way as already explained with respect to FIG. 5. The minimum bulk durations mTBDi (i=1, . . . ,N) are applicable all along the whole session.

In a step 707, the cache server CSERV 130 builds a playlist to be transmitted to the client device CL 140. The playlist (or manifest file) indicates a duration of the partial segments that equals the duration of the bulk of chunks as defined as function of the RTT value. In a particular embodiment, the cache server CSERV 130 adjusts playlist information (or manifest file information) obtained from the originating server OSERV 150 so that the playlist indicates a duration of the partial segments that equals the duration of the bulk of chunks as defined as function of the RTT value. The cache server CSERV 130 transmits the playlist (or manifest file) thus built, or adjusted, to the client device CL 140.

In a step 708, the cache server CSERV 130 delivers the audio and/or video content data in the form of bulks of successive chunks by burst transfers. Each bulk has a size that corresponds to at least one chunk and at most M successive chunks, as already explained with respect to FIG. 5.

Thus, each time the client device CL 140 requests a partial segment of the audio and/or video content, the cache server CSERV 130 delivers, by burst transfers, aggregated chunks forming one bulk as defined above that corresponds to the partial segment duration published in the playlist. The client device CL 140 finds consistent the way the cache server CSERV 130 responds, since the duration of the partial segments as indicated in the playlist matches the duration of the bulk of chunks as defined as function of the RTT value.

The invention claimed is:

1. A method for delivering an audio and/or video content using adaptive streaming from a cache server to a client device, the audio and/or video content being segmented into data segments available in various representations with respective audio and/or video qualities, the representations being time-aligned per segment, the segments being further divided into chunks, wherein the method comprises:

obtaining a round-trip time value applicable between the cache server and the client device;

computing a minimum bulk transfer size mTBS from a maximum average bitrate of the various representations of the audio and/or video content and from the obtained round- trip time value;

computing a minimum bulk duration mTBDi, with respect to the audio and/or video content, for the representation i of the audio and/or video content which has to be delivered to the client device; and delivering the audio and/or video content by burst transfers in the form of L bulks of at least one chunk or aggregated successive chunks for each segment, the L bulks containing jointly audio and/or video content data corresponding to said segment, and wherein, for each segment, at least L−1 bulk or bulks are respectively formed by M chunk or chunks such that $$\sum_{j=1}^{M} CH_j > mTBDi$$

and $$\sum_{j=1}^{M-1} CH_j \leq mTBDi$$

wherein $CH_j$ (j=1, . . . ,M) represents the time duration of the chunk j with respect to the audio and/or video content.

2. The method according to claim 1, wherein the round-trip time value is stored by the cache server as a default configuration parameter and corresponds to the maximum possible round trip time the cache server has to deal with when delivering audio and/or video content data to any client device.

3. The method according to claim 1, wherein the round-trip time value is average round trip time value computed by the cache server over time by analyzing sessions for delivering audio and/or video contents to client devices.

4. The method according to claim 2, wherein such round-trip time value is used as initial configuration and definition of the minimum bulk transfer size mTBS and the minimum bulk duration mTBDi, and then dynamically updated, as well as the minimum bulk transfer size mTBS and the minimum bulk duration mTBDi, according to measurements of round trip time between the cache server and the client device.

5. The method according to claim 1, wherein the same round trip time value is used over a whole session of delivering audio and/or video content.

6. The method according to claim 5, wherein for obtaining the round trip time value, the cache server, when receiving from the client device a request for obtaining a playlist or manifest file related to the audio and/or video content, the cache server redirects the client device so as to force the client device to retransmit the request in question, and computes the round trip time value as the time difference from the instant at which the cache server redirected the client device to the instant at which the cache server receives again the request in question from the client device.

7. The method according to claim 6, wherein the cache server indicates in the playlist or manifest file that a duration of partial segments equals the duration of the bulk of chunks as defined as function of the round trip time value.

8. The method according to any one of claim 1, wherein a manifest file related to the audio and/or video content indicates that segment request can be made as soon as a chunk is theoretically available, and wherein the cache server blocks processing of segment request received from the client device until enough chunks of the requested segment are available in cache to build the bulk to be transmitted in response.

9. An information storage medium storing a computer program comprising program code instructions that can be loaded in a programmable device for implementing the method according to claim 1, when the program code instructions are read from the information storage medium and run by the programmable device.

10. A cache server configured for delivering an audio and/or video content using adaptive streaming to a client device, the audio and/or video content being segmented into data segments available in various representations with respective audio and/or video qualities, the representations being time-aligned per segment, the segments being further divided into chunks, wherein the cache server comprises electronic circuitry configured for:

obtaining a round-trip time value applicable between the cache server and the client device;

computing a minimum bulk transfer size mTBS from the maximum average bitrate of the various representations of the audio and/or video content and from the obtained round- trip time value;

computing a minimum bulk duration mTBDi, with respect to the audio and/or video content, for the representation i of the audio and/or video content which has to be delivered to the client device; and delivering the audio and/or video content by burst transfers in the form of L bulks of at least one chunk or aggregated successive chunks for each segment, the L bulks containing jointly audio and/or video content data corresponding to said segment, and wherein, for each segment, at least L-1 bulk or bulks are respectively formed by M chunk or chunks such that $$\sum_{j=1}^{M} CH_j > mTBDi$$

and $$\sum_{j=1}^{M-1} CH_j \leq mTBDi$$

wherein $CH_j$ (j=1, . . . ,M) represents the time duration of the chunk j with respect to the audio and/or video content.

11. A Content Delivery Network including the cache server according to claim 10.

* * * * *